US012676026B1

(12) United States Patent 
Abou-Rjeili et al.

(10) Patent No.: US 12,676,026 B1 
(45) Date of Patent: Jul. 7, 2026

(54) PARTIAL IMAGE SEARCH

(71) Applicant: Jumio Corporation, Palo Alto, CA (US)

(72) Inventors: Georges Abou-Rjeili, Montreal (CA); Artem Voronin, Montreal (CA)

(73) Assignee: Jumio Corporation, Sunnyvale, CA (US)

( * ) Notice: Subject to any disclaimer, the term of this patent is extended or adjusted under 35 U.S.C. 154(b) by 376 days.

(21) Appl. No.: 17/957,317

(22) Filed: Sep. 30, 2022

(51) Int. Cl.
| | |
|---|---|
| *G06V 40/30* | (2022.01) |
| *G06V 10/74* | (2022.01) |
| *G06V 30/413* | (2022.01) |
| *H04L 9/32* | (2006.01) |

(52) U.S. Cl.
CPC .......... *G06V 40/394* (2022.01); *G06V 10/761* (2022.01); *G06V 30/413* (2022.01); *G06V 40/33* (2022.01); *H04L 9/3236* (2013.01)

(58) Field of Classification Search
CPC .. G06V 40/394; G06V 10/761; G06V 30/413; G06V 40/33; H04L 9/3236
See application file for complete search history.

(56) References Cited

U.S. PATENT DOCUMENTS

| | | | | |
|---|---|---|---|---|
| 4,897,814 A | * | 1/1990 | Clark | ................ G06F 16/90339 |
| | | | | 706/41 |
| 5,425,110 A | | 6/1995 | Spitz | |
| 5,544,255 A | * | 8/1996 | Smithies | .............. G06Q 20/401 |
| | | | | 340/5.83 |

| | | | | |
|---|---|---|---|---|
| 5,668,897 A | * | 9/1997 | Stolfo | ................... G06F 16/284 |
| | | | | 707/E17.02 |
| 5,748,780 A | * | 5/1998 | Stolfo | ................. G06Q 20/042 |
| | | | | 707/E17.023 |
| 5,838,814 A | * | 11/1998 | Moore | ................ G07D 7/0047 |
| | | | | 382/137 |

(Continued)

FOREIGN PATENT DOCUMENTS

| | | |
|---|---|---|
| AU | 2018100581 A4 | 6/2018 |
| MY | 192715 A | 9/2022 |
| WO | 2022/015948 A1 | 1/2022 |

OTHER PUBLICATIONS

"7 Best Face Morph Apps 2024 (Morph Two Faces Together)." ContentMaverickscom, Content Mavericks, 2024, contentmavericks.com/best-face-morph-app/. 2024 Web. 25 pgs. 2024.

(Continued)

*Primary Examiner* — Solomon G Bezuayehu 
(74) *Attorney, Agent, or Firm* — Patent Law Works LLP

(57) ABSTRACT

The disclosure includes a system and method for partial image search including receiving, using one or more processors, an input image representing a first image of an identification document; preprocessing, using the one or more processors, the input image; determining, using the one or more processors, a signature based on the preprocessed image; obtaining, using the one or more processors, information associated with other images, the information associated with the other images including signatures associated with the other images; and determining, using the one or more processors, whether the input image is similar to one or more of the other images based at least in part on their respective signatures.

20 Claims, 9 Drawing Sheets

(56) References Cited

U.S. PATENT DOCUMENTS

| | | | | |
|---|---|---|---|---|
| 6,363,162 | B1* | 3/2002 | Moed | G06V 40/30 |
| | | | | 382/113 |
| 7,040,539 | B1* | 5/2006 | Stover | G07F 7/12 |
| | | | | 235/379 |
| 7,831,531 | B1* | 11/2010 | Baluja | G06N 3/08 |
| | | | | 706/25 |
| 8,326,761 | B1* | 12/2012 | Hecht | G07D 7/0047 |
| | | | | 705/45 |
| 8,352,494 | B1* | 1/2013 | Badoiu | G06F 16/5838 |
| | | | | 707/780 |
| 8,886,648 | B1* | 11/2014 | Procopio | G06F 16/93 |
| | | | | 707/737 |
| 8,910,032 | B2* | 12/2014 | Graves | G11B 27/34 |
| | | | | 710/200 |
| 9,135,517 | B1* | 9/2015 | Adams | G06V 30/414 |
| 9,836,591 | B2 | 12/2017 | John et al. | |
| 10,320,807 | B2* | 6/2019 | Khan | H04L 63/126 |
| 10,628,702 | B1 | 4/2020 | Gerstner et al. | |
| 11,144,752 | B1 | 10/2021 | Castelblanco et al. | |
| 11,416,562 | B1* | 8/2022 | Gruhl | G06F 16/24578 |
| 11,593,439 | B1* | 2/2023 | Avadhani | G06F 16/325 |
| 11,625,954 | B2 | 4/2023 | Kwak et al. | |
| 11,715,102 | B2* | 8/2023 | Edwards | G06Q 20/40145 |
| | | | | 705/44 |
| 11,900,755 | B1 | 2/2024 | Bueche, Jr. | |
| 12,197,483 | B1 | 1/2025 | Shmukler et al. | |
| 12,387,512 | B1 | 8/2025 | Sureka et al. | |
| 2002/0064305 | A1* | 5/2002 | Taylor | G06T 7/564 |
| | | | | 382/154 |
| 2003/0172066 | A1* | 9/2003 | Cooper | G06F 16/30 |
| 2003/0229637 | A1 | 12/2003 | Baxter et al. | |
| 2004/0155877 | A1* | 8/2004 | Hong | G06T 7/11 |
| | | | | 345/419 |
| 2006/0026156 | A1 | 2/2006 | Zuleba | |
| 2006/0041506 | A1* | 2/2006 | Mason | G06Q 20/042 |
| | | | | 705/42 |
| 2006/0124726 | A1* | 6/2006 | Kotovich | G06Q 20/042 |
| | | | | 235/379 |
| 2006/0164682 | A1* | 7/2006 | Lev | H04N 1/387 |
| | | | | 358/1.15 |
| 2007/0078846 | A1* | 4/2007 | Gulli | G06F 16/951 |
| | | | | 707/999.005 |
| 2007/0086628 | A1* | 4/2007 | Fuchs | G06V 40/30 |
| | | | | 382/119 |
| 2007/0116328 | A1 | 5/2007 | Sablak | |
| 2007/0150387 | A1 | 6/2007 | Seubert et al. | |
| 2007/0256010 | A1 | 11/2007 | Blackmon et al. | |
| 2008/0065630 | A1* | 3/2008 | Luo | G06F 16/258 |
| 2008/0149713 | A1 | 6/2008 | Brundage | |
| 2009/0060396 | A1* | 3/2009 | Blessan | G06V 30/18086 |
| | | | | 382/317 |
| 2009/0152357 | A1 | 6/2009 | Lei et al. | |
| 2009/0261158 | A1* | 10/2009 | Lawson | G07D 7/0047 |
| | | | | 235/379 |
| 2010/0027896 | A1* | 2/2010 | Geva | G06V 30/40 |
| | | | | 382/229 |
| 2011/0057040 | A1 | 3/2011 | Jones | |
| 2011/0128360 | A1 | 6/2011 | Hatzav et al. | |
| 2013/0129159 | A1 | 5/2013 | Huijgens et al. | |
| 2014/0002872 | A1 | 1/2014 | Cook | |
| 2014/0046954 | A1 | 2/2014 | Maclean et al. | |
| 2014/0161326 | A1 | 6/2014 | Ganong et al. | |
| 2015/0100590 | A1* | 4/2015 | Robinson | G06F 16/93 |
| | | | | 707/749 |
| 2015/0242592 | A1* | 8/2015 | Weiss | G16H 10/60 |
| | | | | 705/2 |
| 2015/0341370 | A1 | 11/2015 | Khan | |
| 2016/0005050 | A1 | 1/2016 | Teman | |
| 2016/0098399 | A1* | 4/2016 | Casperson | G06F 16/355 |
| | | | | 707/738 |
| 2016/0210450 | A1* | 7/2016 | Su | G06F 21/552 |
| 2017/0161375 | A1* | 6/2017 | Stoica | G06F 16/353 |
| 2017/0193285 | A1 | 7/2017 | Negi | |

| | | | | |
|---|---|---|---|---|
| 2017/0277945 | A1* | 9/2017 | Budihal | G06V 10/25 |
| 2017/0322932 | A1 | 11/2017 | Deschenes et al. | |
| 2017/0337449 | A1* | 11/2017 | Hamada | G06N 3/045 |
| 2017/0351909 | A1 | 12/2017 | Kaehler | |
| 2018/0060874 | A1 | 3/2018 | Kelts et al. | |
| 2018/0075090 | A1* | 3/2018 | Knight | G06F 16/24 |
| 2018/0186164 | A1 | 7/2018 | Wu | |
| 2018/0204113 | A1* | 7/2018 | Galron | G06F 18/214 |
| 2018/0293461 | A1* | 10/2018 | Le Borgne | G06F 18/22 |
| 2018/0300296 | A1* | 10/2018 | Ziraknejad | G06F 16/93 |
| 2018/0373859 | A1 | 12/2018 | Ganong | |
| 2019/0035431 | A1 | 1/2019 | Attorre | |
| 2019/0205686 | A1 | 7/2019 | Mayer et al. | |
| 2019/0272549 | A1* | 9/2019 | Mossoba | G06V 30/413 |
| 2019/0278986 | A1 | 9/2019 | Nepomniachtchi | |
| 2020/0184201 | A1 | 6/2020 | Kaehler | |
| 2020/0304650 | A1 | 9/2020 | Roach | |
| 2020/0342600 | A1* | 10/2020 | Sjöstrand | A61B 6/5229 |
| 2020/0366671 | A1 | 11/2020 | Larson et al. | |
| 2021/0075788 | A1 | 3/2021 | Pasterk et al. | |
| 2021/0124919 | A1 | 4/2021 | Balakrishnan | |
| 2021/0174016 | A1 | 6/2021 | Fox et al. | |
| 2021/0248401 | A1 | 8/2021 | Timoshenko et al. | |
| 2021/0259660 | A1* | 8/2021 | Bharat | A61B 8/485 |
| 2021/0307841 | A1* | 10/2021 | Buch | A61B 5/4893 |
| 2021/0320801 | A1 | 10/2021 | Wyss | |
| 2021/0326461 | A1 | 10/2021 | Paul et al. | |
| 2021/0326629 | A1 | 10/2021 | Slattery | |
| 2022/0028086 | A1* | 1/2022 | Woodard | G06T 5/20 |
| 2022/0058660 | A1* | 2/2022 | Ivanov | G06F 21/554 |
| 2022/0114456 | A1 | 4/2022 | Nouri et al. | |
| 2022/0180113 | A1 | 6/2022 | Patel et al. | |
| 2022/0182430 | A1* | 6/2022 | Bennett-James | |
| | | | | H04N 21/44008 |
| 2022/0385880 | A1 | 12/2022 | Nims | |
| 2023/0013380 | A1 | 1/2023 | Choi et al. | |
| 2023/0017185 | A1 | 1/2023 | Cheong et al. | |
| 2023/0083000 | A1 | 3/2023 | Fujimoto et al. | |
| 2023/0113148 | A1 | 4/2023 | Zlotnick | |
| 2023/0129350 | A1* | 4/2023 | Bryan | G06F 16/632 |
| | | | | 707/705 |
| 2023/0143239 | A1 | 5/2023 | Yusuf et al. | |
| 2023/0196628 | A1* | 6/2023 | Bischoff | G06T 15/205 |
| | | | | 382/103 |
| 2023/0298031 | A1 | 9/2023 | Drapeau et al. | |
| 2023/0421602 | A1* | 12/2023 | Boyer | G06V 30/10 |
| 2024/0046686 | A1 | 2/2024 | Ye et al. | |
| 2024/0193970 | A1 | 6/2024 | Hsu et al. | |
| 2024/0202294 | A1 | 6/2024 | Yogerst et al. | |
| 2024/0205239 | A1 | 6/2024 | Bonev et al. | |
| 2024/0411982 | A1 | 12/2024 | Malanga et al. | |
| 2025/0005950 | A1 | 1/2025 | Eren | |
| 2025/0218226 | A1 | 7/2025 | Marshalkin | |
| 2025/0225527 | A1 | 7/2025 | Jiang et al. | |

OTHER PUBLICATIONS

"Levenshtein Distance." Wikipedia, Wikimedia Foundation, Dec. 23, 2023, en.wikipedia.org/wiki/Levenshtein_distance. Web. 6 pgs. 2023.

"New Method Detects Deepfake Videos with up to 99% Accuracy." News, May 3, 2022, news.ucr.edu/articles/2022/05/03/new-method-detects-deepfake-videos-99-accuracy. Web. 3 pgs. 2022.

Aslam, Asra, et al., May 15, 2019, Depth-Map Generation using Pixel Matching in Stereoscopic Pair of Images, https://arxiv.org/pdf/1902.03471.pdf, 5 pgs. 2019.

Bassil, Youssef, and Mohammad Alwani. "Context-Sensitive Spelling Correction Using Google Web 1T 5-Gram Information." Computer and Information Science (Toronto), vol. 5, No. 3, 2012, p. 37. 2012.

Bassil, Youssef, and Mohammad Alwani. "OCR Post-Processing Error Correction Algorithm Using Google Online Spelling Suggestion." ArXiv.org, 2012, pp. arXiv.org, 2012. 2012.

Benalcazar, Daniel, et al. "Synthetic ID Card Image Generation for Improving Presentation Attack Detection." IEEE Transactions on Information Forensics and Security, vol. 18, 2023, pp. 1814-1824. 2023.

(56) References Cited

OTHER PUBLICATIONS

Canada Passport Phot Security Features, Canada.ca, Government of Canada (Dec. 20, 2022) https://www.canada.ca/en/immigration-refugees-citizenship/services/canadian-passports/photos.html#photo, webpage 11 pgs. 2022.

Casado, Constantino Alvarez, et al. "Real-time Face Alignment: Evaluation Methods, Training Strategies and Implementation Optimization." Journal of Real-time Image Processing 18.6 (2021): 2239-2267. Web. 2021.

Deepswap.AI, "Deepswap—Best Face and Video Edit Tools Online." DeepSwap AI, www.deepswap.ai/?utm_source=bing&cp_id=441169896&msclkid=eb76125c4d531cf9797e77325a694067. Accessed Dec. 2023. Web. 11 pgs. 2023.

DEVCODEF1 Editors, Using LLMS for OCR text proofreading: A guide for software developers. Dev Code F1. May 26, 2023, <https://devcodef1.com/news/1007434/llms-for-ocr-text-proofreading> Web. 3 pgs. 2023.

Edge Detection Using OpenCV, LearnOpenCV.com, (2023) https://learnopencv.com/edge-detection-using-opencv/, webpage. 10 pgs. 2023.

Elsayed, M et al. "A New Method for Full Reference Image Blur Measure." International Journal of Simulation: Systems Science and Technology V19 N1 (Feb. 1, 2018): 7.1-7.5 2018 https://doi.org/10.5013/IJSSST.a.19.01.7. 2018.

Faceshape. "Face Morphing Simulator—Morph Two Faces Together." Face Morphing Simulator—Morph Two Faces Together, www.faceshape.com/face-morph. (2022) Web. 2 pgs. 2022.

Fadilpašić, Sead. "Deepfake Fraud Attacks Are Hitting More and More Businesses." TechRadar, TechRadar Pro, Feb. 24, 2023, www.techradar.com/news/deepfake-fraud-attacks-are-hitting-more-and-more-businesses. Accessed Jan. 12, 2024. Web. 8 pgs. 2023.

Github, Use Llama2 to Improve the Accuracy of Tesseract OCR. GitHub. (n.d.). https://github.com/Dicklesworthstone/llama2_aided_tesseract> Web. Last updated Aug. 2, 2023. 3 pgs. 2023.

Help Net Security. "Detecting Face Morphing: A Simple Guide to Countering Complex Identity Fraud." Help Net Security, Mar. 16, 2023, www.helpnetsecurity.com/2023/03/20/facial-morphing-technology/. Web. 5 pgs. 2023.

Hu, Yifei, et al. "Misspelling Correction with Pre-Trained Contextual Language Model." ArXiv.org, 2021, pp. arXiv.org, 2021. 2021.

Kaspersky Secure Futures Editors, DevCodeF1. "Using LLMS for OCR Text Proofreading: A Guide for Software Developers." Dev Code F1, DevCodeF1.Com—Software Developer News and Knowledge Base, May 26, 2023, devcodef1.com/news/1007434/llms-for-ocr-text-proofreading. Accessed Jan. 12, 2024. Web. 8 pgs. 2023.

Kramer, Robin S. S., et al. "Face Morphing Attacks: Investigating Detection with Humans and Computers." Cognitive Research: Principles and Implications, vol. 4, No. 1, 2019, p. 28. 2019.

Kumar, Varun. "14 Best Deepfake Apps and Tools in 2024." RankRed, Jan. 1, 2024, www.rankred.com/best-deepfake-apps-tools/. Web. 22 pgs. 2024.

Lee, Jung-Hun, et al. "Deep Learning-Based Context-Sensitive Spelling Typing Error Correction." IEEE Access, vol. 8, 2020, pp. 152565-152578. 2020.

Liu, Zhaoxiang, et al. "Facial Pose Estimation by Deep Learning from Label Distributions." (2019). Web. IEEE/CVF International Conference on Computer Vision Workshop (ICCVW), 9 pgs. 2019.

Lowphansirkul, Lalita, et al. "WangchanBERTa: Pretraining Transformer-Based Thai Language Models." ArXiv.org, 2021, pp. arXiv.org, 2021. 2021.

Luo, Yinhui et al. "A Review of Homography Estimation: Advances and Challenges." Electronics 2023 pp. 4977-4977. https://www.mdpi.com/2079-9292/12/24/4977 2023.

Lyu, Siwei, "Detecting 'deepfake' Videos in the Blink of an Eye." The Conversation, Sep. 15, 2022, theconversation.com/detecting-deepfake-videos-in-the-blink-of-an-eye-101072. Web. 4 pgs. 2022.

Mazaheri, Ghazal et al. "2022 Ieee/Cvf Winter Conference on Applications of Computer Vision (Wacv)." Detection and Localization of Facial Expression Manipulations IEEE 2022 pp. 2773-2783 2022.

Nightingale, Sophie J., et al. "Perceptual and Computational Detection of Face Morphing." Journal of Vision (Charlottesville, Va.), vol. 21, No. 3, 2021, p. 4. 2021.

Passport Photo Specifications., Government of Canada (2015) https://www.canada.ca/content/dam/ircc/migration/ircc/english/pdf/pub/pass-photo-spec-eng.pdf, 5 pgs. 2015.

Picsi.AI, "Create Realistic Face Morphs" Picsi.AI, InsightFace, 2023, www.picsi.ai/. Web. 8 pgs. 2023.

Rosebrock, A. (2021, Nov. 16). OCR passports with opencv and Tesseract. PylmageSearch. <https://pyimagesearch.com/2021/12/01/ocr-passports-with-opencv-and-tesseract/> Web. 24 pgs. 2021.

Rosebrock, Adrian, "OpenCV Fast Fourier Transform (FFT) for blur detection in images and video streams." PylmageSearch.com, Jun. 15, 2020, webpage, 21 pgs. https://pyimagesearch.com/2020/06/15/opencv-fast-fourier-transform-fft-for-blur-detection-in-images-and-video-streams/ 2020.

Rosebrock, Adrian, Blur Detection with OpenCV PylmageSearch. com, Sept. 7, 2015, https://pyimagesearch.com/2015/09/07/blur-detection-with-opencv/, webpage, 13 pgs. 2015.

Sadeghzadeh, Arezoo, et al., "Pose-invariant face recognition based on matching the occlusion free regions aligned by 3D generic model." IET Computer Vision, Aug. 2020, vol. 14, Issue 5, pp. 177-287. 2020.

Schulz, Daniel, et al., "Identify Documents Image Quality Assessment." European Association for Signal Processing, Proceedings 2022 pp. 1017-1021. 2022.

Seibold, C., et al., "Detection of Face Morphing Attacks by Deep Learning." Digital Forensics and Watermarking. IWDW (2017). Lecture Notes in Computer Science(), vol. 10431. Springer, Cham. https://doi.org/10.1007/978-3-319-64185-0_9 2017.

Shokat, Sana, et al. "Analysis and Evaluation of Braille to Text Conversion Methods." Mobile Information Systems, vol. 2020, 2020, pp. 1-14. 2020.

Shokat, Sana, et al. "Characterization of English Braille Patterns Using Automated Tools and RICA Based Feature Extraction Methods." Sensors (Basel, Switzerland), vol. 22, No. 5, 2022, p. 1836. 2022.

Tesseract-OCR, Improving the Quality of the Output Github.com, Tesseract User Manual v. 5.x, 9 pgs, updated Dec. 5, 2023. Web. 2023.

Times, Global. "Tencent Launches Large Language Model 'Hunyuan' amid Global Generative Ai Frenzy." Global Times,Sep. 7, 2023, www.globaltimes.cn/page/202309/1297761.shtml. 6 pgs. 2023.

Youtube, YouTube, "Morphing Identity: A real-time face morphing system to transforming face identity." May 15, 2021, Cybernetic Humanity Studio. https://youtu.be/ahKxwaJ3k_U?si=kp4G4wFa8IAsGNLY 2021.

Zhang, Erhu, et al. "Forgery Detection for Perforated Number in Security Document by Analysing the Perforated Holes." The Imaging Science Journal 65.1 (2017): 40-48. Web. 2017.

Zhao, Jian et al. "2018 Ieee/Cvf Conference on Computer Vision and Pattern Recognition." Towards Pose Invariant Face Recognition in the Wild IEEE 2018 pp. 2207-2216. 2018.

Di Guardo, Fabrizio. "Facemask-a Real-Time Face Morphing Tool." Medium, Level Up Coding, May 2, 2023, levelup.gitconnected.com/facemask-a-real-time-face-morphing-tool-5b343591a237. May 2, 2023.

"Face Landmark Detection Guide | Google Ai Edge | Google AI for Developers." Google, ai.google.dev/edge/mediapipe/solutions/vision/face_landmarker.

"Image Segmentation Guide | Google Ai Edge | Google AI for Developers." Google, ai.google.dev/edge/mediapipe/solutions/vision/image_segmenter.

Kirillov, Alexander et al. "Segment Anything." 2023 IEEE/CVF International Conference on Computer Vision (ICCV), Oct. 1, 2023, doi:10.1109/iccv51070.2023.00371. Oct. 1, 2023.

"Large Language and Vision Assistant." LLaVA, llava-vl.github.io/.

Liu, Haotian, et al. "Visual Instruction Tuning." 37th Conference on Neural Information Processing Systems, Dec. 11, 2023, arxiv.org/pdf/2304.08485. Dec. 11, 2023.

"Llava 1.6—a Hugging Face Space by Liuhaotian." LLaVA 1.6—a Hugging Face Space by Liuhaotian, huggingface.co/spaces/liuhaotian/LLaVA-1.6.

(56) References Cited

OTHER PUBLICATIONS

Wang, Xin, et al. "Attribute-Aware Implicit Modality Alignment for Text Attribute Person Search." Arxiv.Org, Jun. 6, 2024. Jun. 6, 2024.

Wang, Zhe, et al. "Attribute-guided Transformer for Robust Person Re-identification." IET Computer Vision, vol. 17, No. 8, Jun. 23, 2023, pp. 977-992, doi:10.1049/cvi2.12215. Jun. 23, 2023.

PCT International Search Report and Written Opinion; Application No. PCT/US23/86219 Jumio Corporation, International filing date of Dec. 28, 2023, date of mailing May 23, 2024, 4 pages.

PCT International Search Report and Written Opinion; Application No. PCT/US23/79821 Jumio Corporation, International filing date of Nov. 15, 2023, date of mailing Apr. 4, 2024, 10 pages.

PCT International Search Report and Written Opinion; Application No. PCT/US2024/048525 Jumio Corporation, International filing date of Sep. 26, 2024, date of mailing Nov. 27, 2024, 10 pages. 2024.

PCT International Search Report and Written Opinion; Application No. PCT/US23/79511 Jumio Corporation, International filing date of Nov. 13, 2023, date of mailing Mar. 4, 2024, 17 pages.

PCT International Search Report and Written Opinion; Application No. PCT/US24/62269 Jumio Corporation, International filing date of Dec. 30, 2024, date of mailing Mar. 7, 2025, 11 pages.

Huang, Jing, et al. "A multiplexed network for end-to-end, multi-lingual OCR." Proceedings of the IEEE/CVF conference on computer vision and pattern recognition. 2021. (Year: 2021).

Nguyen, Thi Tuyet Hai, et al. "Neural machine translation with BERT forpost-OCR error detection and correction." Proceedings of the ACM/IEEE joint conference on digital libraries in 2020. 2020. (Year: 2020).

* cited by examiner

200

206

Processor
202

Communication Unit
208

114/116

Display
218

Memory
204

Partial Image Search
226

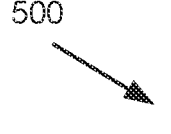
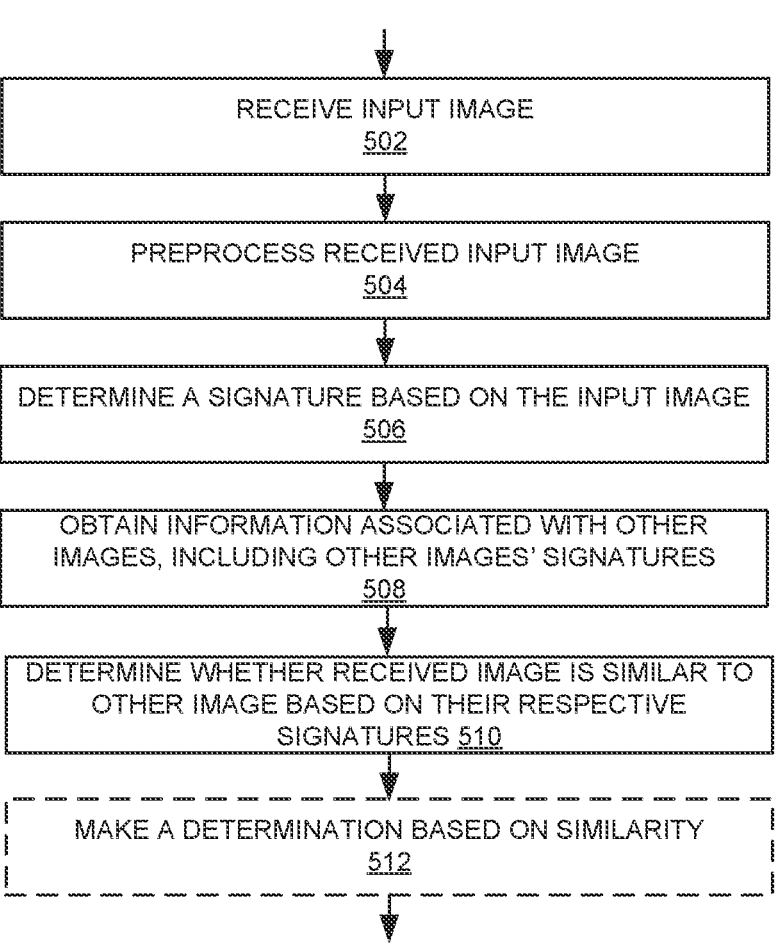
Figure 5

504

RECTIFY IMAGE TO SEPARATE IMAGE INTO DOCUMENT
PORTION AND BACKGROUND PORTION 602

SEGMENT AT LEAST ONE OF THE DOCUMENT PORTION
AND THE BACKGROUND PORTION
604

APPLY ONE OR MORE TRANSFORMATIONS TO AT LEAST
OF THE DOCUMENT PORTION AND THE BACKGROUND
PORTION 606

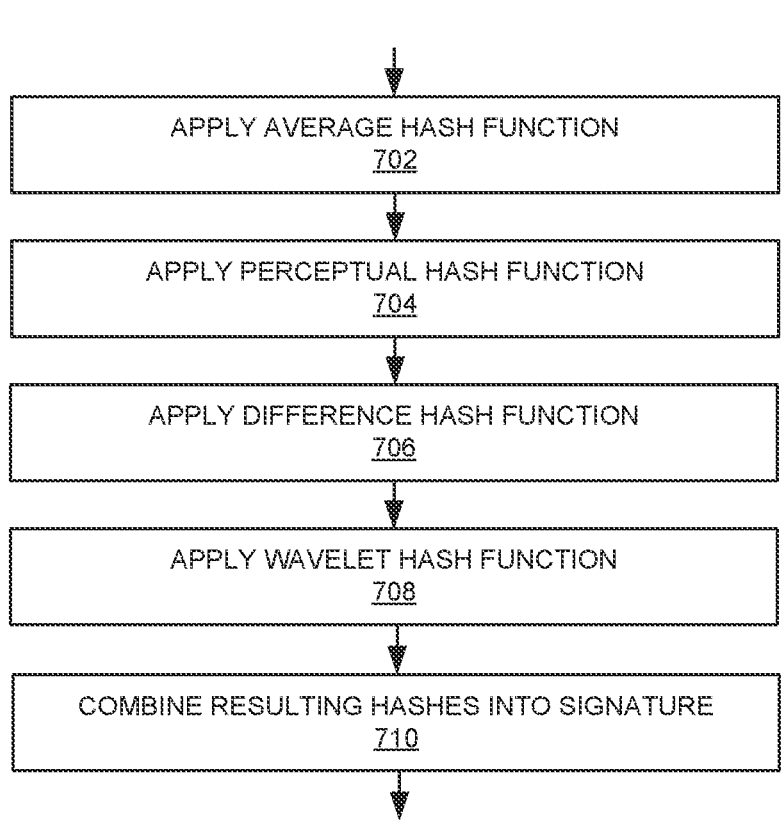
Figure 7

508

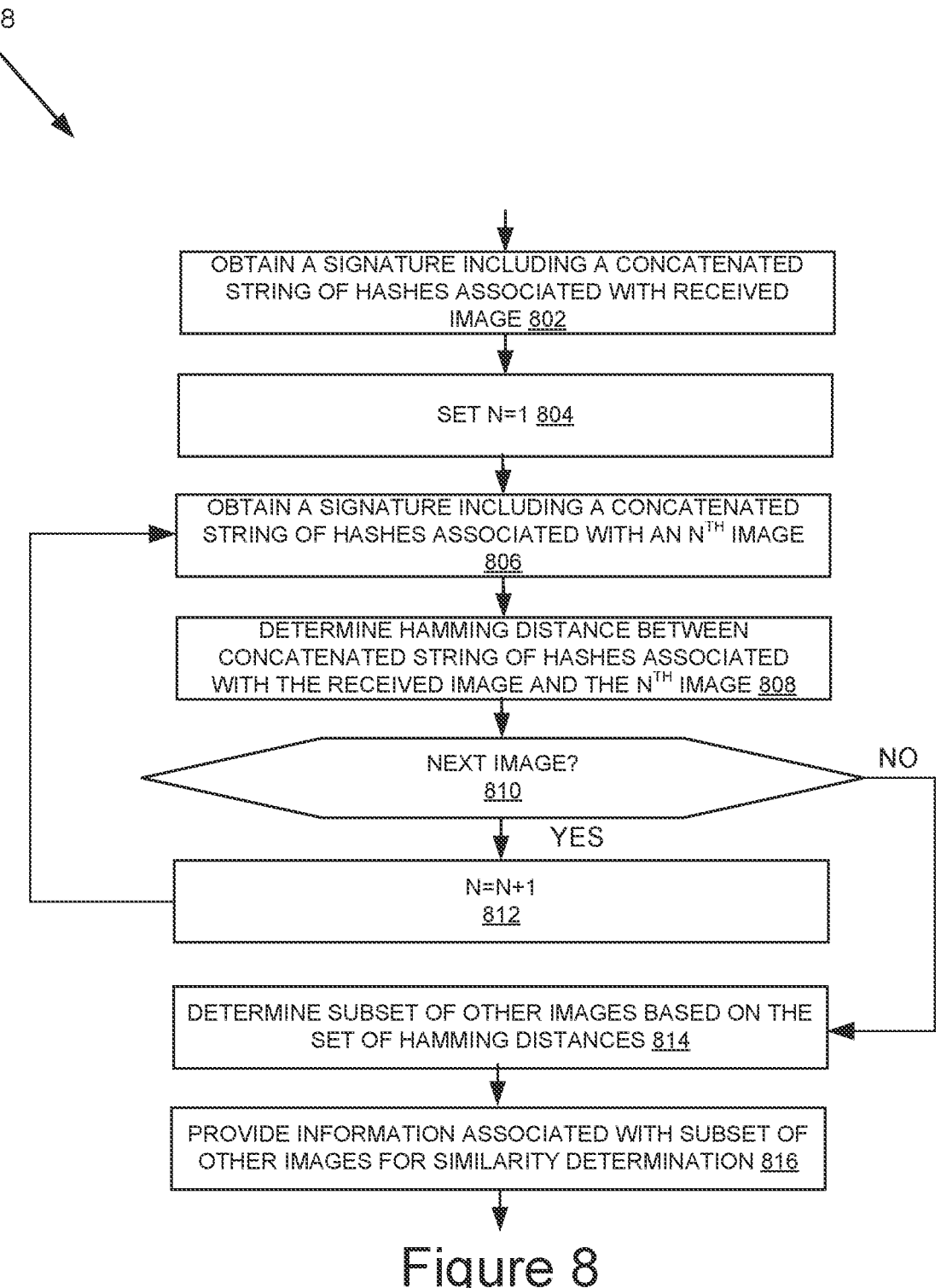

OBTAIN A SIGNATURE INCLUDING A CONCATENATED STRING OF HASHES ASSOCIATED WITH RECEIVED IMAGE 802

SET N=1 804

OBTAIN A SIGNATURE INCLUDING A CONCATENATED STRING OF HASHES ASSOCIATED WITH AN N$^{TH}$ IMAGE 806

DETERMINE HAMMING DISTANCE BETWEEN CONCATENATED STRING OF HASHES ASSOCIATED WITH THE RECEIVED IMAGE AND THE N$^{TH}$ IMAGE 808

NEXT IMAGE? 810

NO

YES

N=N+1 812

DETERMINE SUBSET OF OTHER IMAGES BASED ON THE SET OF HAMMING DISTANCES 814

PROVIDE INFORMATION ASSOCIATED WITH SUBSET OF OTHER IMAGES FOR SIMILARITY DETERMINATION 816

OBTAIN SIGNATURE ASSOCIATED WITH RECEIVED INPUT IMAGE 902

OBTAIN SIGNATURE ASSOCIATED WITH OTHER IMAGE(S) 904

DETERMINE COSINE SIMILARITY 906

OBTAIN OTHER FEATURE DATA 908

DETERMINE WHETHER RECEIVED IMAGE IS SIMILAR TO OTHER IMAGE(S) BASED IN PART ON COSINE SIMILARITY 910

PARTIAL IMAGE SEARCH

BACKGROUND

The present disclosure relates to image capture. More specifically, the present disclosure relates to capturing image data representing a document.

Documentation be provided for any number of reasons or in association with any number of transactions. For example, providing picture ID may be required to open a financial account to reduce the risk of fraud and/or to comply with laws (e.g., anti-money laundering or sanctions). In another example, a copy of recent bank statement or utility bill with a street address may be provided to prove a place of residence, which may be relevant for obtaining a library card, registering for school in a school district, registering to vote in a district, etc. In yet another example, an image of a check may be provided to deposit the check.

SUMMARY

This specification relates to methods and systems for partial image search. According to one aspect of the subject matter described in this disclosure, a computer-implemented method of partial image search includes receiving, using one or more processors, an input image representing a first image of an identification document; preprocessing, using the one or more processors, the input image; determining, using the one or more processors, a signature based on the preprocessed image; obtaining, using the one or more processors, information associated with other images, the information associated with the other images including signatures associated with the other images; and determining, using the one or more processors, whether the input image is similar to one or more of the other images based at least in part on their respective signatures.

Other implementations of one or more of these aspects include corresponding systems, apparatus, and computer programs, configured to perform the actions of the methods, encoded on computer storage devices.

These and other implementations may each optionally include one or more of the following features. For instance, preprocessing the image includes: rectifying the input image to separate the image into a document portion and a background portion; and applying one or more transforms to at least one of the document portion and the background portion, wherein the signature is determined based on at least one of the document portion and the background portion post transformation. For instance, the features include making a determination based on whether the input image is similar to one or more of the other images, wherein the determination includes one or more of rejecting the image, flagging the image as fraudulent, subjecting a user to additional verification, subjecting the user to a higher level of scrutiny, rejecting the user, subjecting a user request to additional verification, subjecting the user request to a higher level of scrutiny, rejecting the user request. For instance, the features include determining the signature includes applying one or more hash functions, wherein the one or more hash functions include one or more of an average hash function, a perceptual hash function, a difference hash function, and a perceptual hash function. For instance, the features include determining whether the input image is similar to one or more of the other images based at least in part on their respective hashes includes: concatenating the one or more hashes associated with the input image, the one or more hashes generated by applying the one or more hash functions; obtaining concatenated hashes associated with the other images; and determining a set of cosine similarities between the concatenated hashes associated with the input image and the concatenated hashes associated with the other images, and wherein determining whether the input image is similar to one or more of the other images is based at least in part on the cosine similarity between their respective concatenated hashes. For instance, the features include determining whether the input image is similar to one or more of the other images is based at least in part on the cosine similarity between their respective concatenated hashes satisfying a threshold. For instance, the features include determining whether the input image is similar to one or more of the other images is based at least in part on the cosine similarity between their respective concatenated hashes and a set of other features, wherein the other features include one or more of a number of similar other image and a subtype associated with the identification document in the input image. For instance, the features include concatenating the one or more hashes associated with the input image, the one or more hashes generated by applying the one or more hash functions; obtaining concatenated hashes associated with the other images; determining a set of hamming distances between the concatenated hashes associated with the input image and the concatenated hashes associated with the other images; and determining a subset of other images based on the set of hamming distances, the subset of other images including a number of other images associated with the smallest hamming distances, wherein the obtained information associated with other images includes information associated with subset of other images. For instance, the features include determining whether the input image is similar to one or more of the other images applies a machine learning model. For instance, the features include determining whether the input image is similar to one or more of the other images applies a machine learning model, wherein the machine learning model is based on a random forest or neural network.

BRIEF DESCRIPTION OF THE DRAWINGS

The disclosure is illustrated by way of example, and not by way of limitation in the figures of the accompanying drawings in which like reference numerals are used to refer to similar elements.

FIG. 5 is a flowchart of an example method for partial image search in accordance with some implementations.

FIG. 7 is a flowchart of an example method for determining an image signature in accordance with some implementations.

FIG. 8 is a flowchart of an example method for retrieval of data for a similarity comparison in accordance with some implementations.

DETAILED DESCRIPTION

Figure 1:
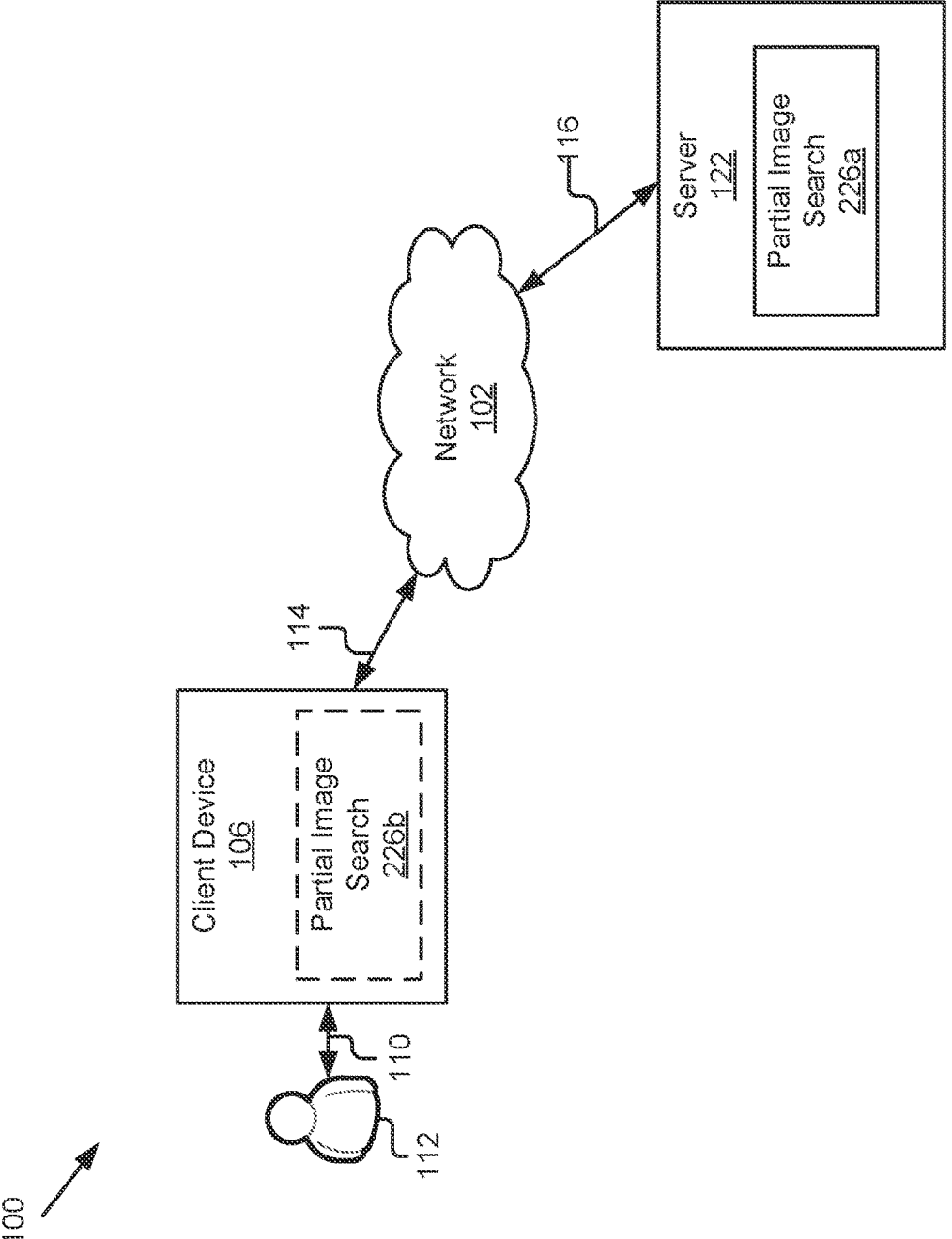
FIG. 1 is a block diagram of one example implementation of a system for partial image search in accordance with some implementations.

The present disclosure is described in the context of an example partial image search and use cases; however, those skilled in the art should recognize that the document detector may be applied to other environments and use cases without departing from the disclosure herein.

Documentation be provided for any number of reasons or transactions. For example, providing picture ID may be required to open a financial account to reduce the risk of fraud and/or to comply with laws (e.g., anti-money laundering or sanctions). In another example, a copy of recent bank statement or utility bill with a street address may be provided to prove a place of residence, which may be relevant for obtaining a library card, registering for school in a school district, registering to vote in a district, etc. In yet another example, an image of a check may be provided to deposit the check.

Increasingly, transactions are being performed remotely or electronically, e.g., online through web browsers or mobile applications. Obtaining documentation remotely or electronically presents challenges, which are not present when a person physically presents the documentation in the physical world. When a person physically presents the documentation in the physical world, the document may be manipulated in order to find, view, and extract information from the document. In a remote or electronic transaction, direct physical manipulation and viewing of the physical document is not feasible. Rather, image data (e.g., a photo or video) of the document may be obtained, attributes (or data) extracted from the image, and compared to reference documentation.

Users with nefarious intent (e.g., criminals, fraudsters, money launderers, etc.) may attempt to trick the systems and methods used to verify documentation provided remotely and electronically. It is sometimes the case that the more times a fraudster (or other nefarious user) is able to attempt fraud, the more likely the fraudster is to eventually succeed in defeating the document verification mechanisms. Therefore, detection of repeated fraudulent attempts may be used in identifying and preventing future, potentially successful, fraudulent attempts. However, criminals including fraudsters are resourceful and may not use identical instances of a document or image of a document.

Advances in technologies have decreased the burden on nefarious users and increased the difficulty of preventing fraud in such remote, electronic transactions, particularly at scale. For example, image manipulation software (e.g., Adobe's Photoshop) has allowed users to quickly and easily manipulate and create different versions of documents or images thereof, such as fake IDs with different images or information in the various fields such as name). The fraudster may print out the various versions of the fraudulent (e.g., doctored) documentation and use the various versions in a series of attempts to successfully commit fraud. Alternatively, development kits and injectors may allow a fraudster to inject an image of a fraudulent document in place of a live image captured by the user device's camera during an onboarding process.

Often a nefarious user who repeatedly attempt to commit fraud do not use completely distinct documents or images of documents across his/her multiple attempts. For example, the fraudster use a first instance of a document, then modify the name, then modify the date of birth and ID number, and so on, but there will be commonalities between the attempts. Examples of commonalities may include, but are not limited to, the document's surroundings or background; the facial image; the issuer of the ID; the size, orientation, or position of the document in the image; etc. Identifying repeated fraudulent attempts that use similar, but not identical images, presents a challenge. For example, existing methods using hashes may determine identicality, but not similarity that does not rise to the level of identicality.

The partial image search 226 described herein may address, at least in part, one or more of the foregoing issues and/or provide, at least in part, one or more of the aforementioned benefits.

FIG. 1 is a block diagram of an example system 100 for partial image search in accordance with some implementations. As depicted, the system 100 includes a server 122 and a client device 106 coupled for electronic communication via a network 102.

The client device 106 is a computing device that includes a processor, a memory, and network communication capabilities (e.g., a communication unit). The client device 106 is coupled for electronic communication to the network 102 as illustrated by signal line 114. In some implementations, the client device 106 may send and receive data to and from other entities of the system 100 (e.g., a server 122). Examples of client devices 106 may include, but are not limited to, mobile phones (e.g., feature phones, smart phones, etc.), tablets, laptops, desktops, netbooks, portable media players, personal digital assistants, etc.

Although only a single client device 106 is shown in the example of FIG. 1, there may be any number of client devices 106 depending on the implementation. The system 100 depicted in FIG. 1 is provided by way of example and the system 100 and further systems contemplated by this present disclosure may include additional and/or fewer components, may combine components and/or divide one or more of the components into additional components, etc. For example, the system 100 may include any number of client devices 106, networks 102, or servers 122.

The network 102 may be a conventional type, wired and/or wireless, and may have numerous different configurations including a star configuration, token ring configuration, or other configurations. For example, the network 102 may include one or more local area networks (LAN), wide area networks (WAN) (e.g., the Internet), personal area networks (PAN), public networks, private networks, virtual networks, virtual private networks, peer-to-peer networks, near field networks (e.g., Bluetooth®, NFC, etc.), cellular (e.g., 4G or 5G), and/or other interconnected data paths across which multiple devices may communicate.

The server 122 is a computing device that includes a hardware and/or virtual server that includes a processor, a memory, and network communication capabilities (e.g., a communication unit. The server 122 may be communicatively coupled to the network 102, as indicated by signal line 116. In some implementations, the server 122 may send and receive data to and from other entities of the system 100 (e.g., one or more client devices 106).

Other variations and/or combinations are also possible and contemplated. It should be understood that the system 100 illustrated in FIG. 1 is representative of an example system and that a variety of different system environments and configurations are contemplated and are within the scope of the present disclosure. For example, various acts and/or functionality may be moved from a server to a client, or vice versa, data may be consolidated into a single data store or further segmented into additional data stores, and some implementations may include additional or fewer computing devices, services, and/or networks, and may implement various functionality client or server-side. Furthermore, various entities of the system may be integrated into a single computing device or system or divided into additional computing devices or systems, etc.

For example, as depicted, the client device 106 may optionally (as indicated by the dashed lines) include an instance of the partial image search 226a and the server 122 may include an instance of the partial image search 226a. However, in some implementations, the components and functionality of the partial image search 226 may be entirely client-side (i.e., at 226b), entirely server side (i.e., at 226a), or divide among the client device 106 and server 122 (i.e., divided across 226a and 226b). For example, as described below, some implementations may use machine learning (e.g., one or more algorithms to train one or more models), and the training and validation of the model(s) may be performed server-side at 226a and applied, during production, client side at 226b.

Figure 2:
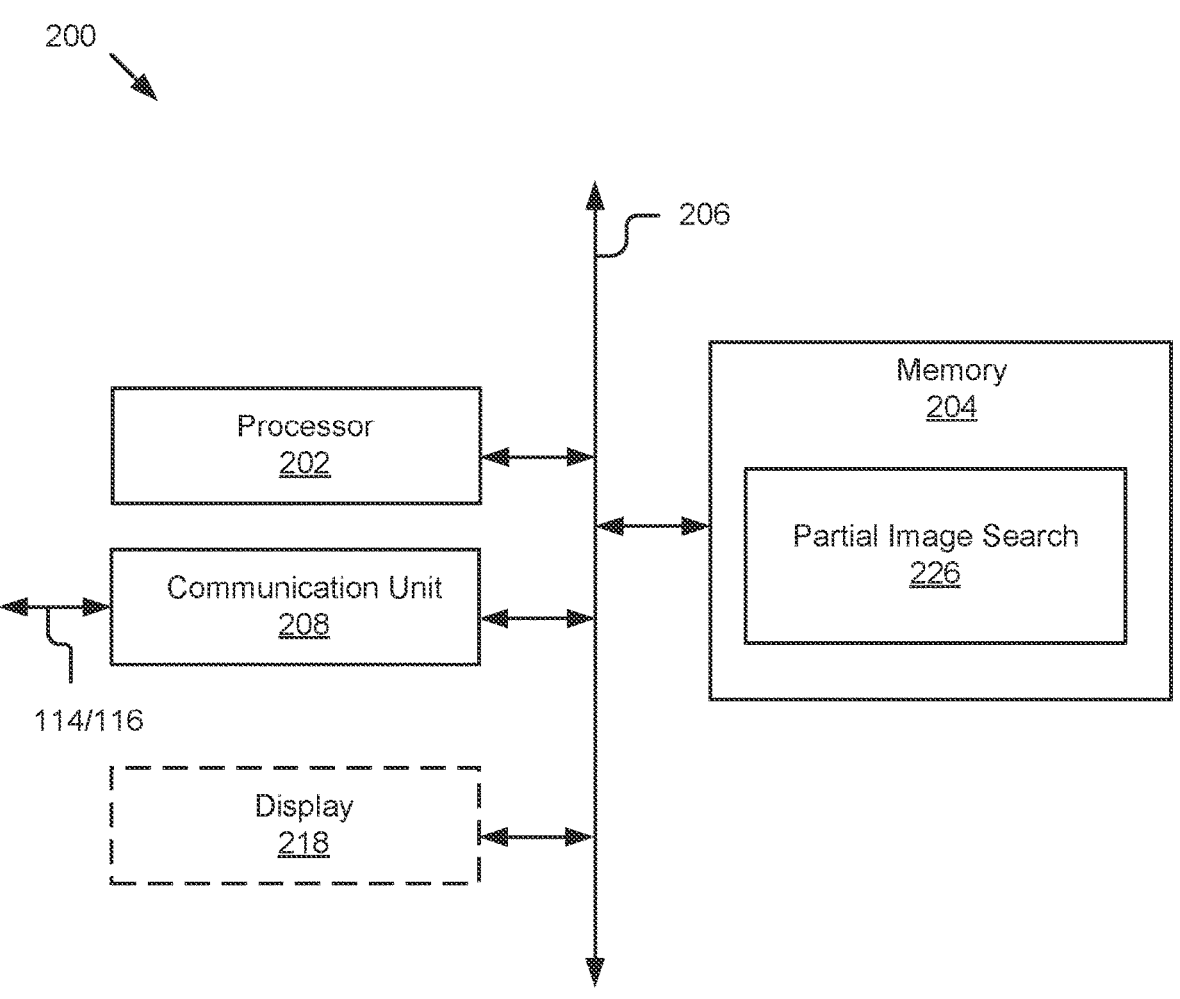
FIG. 2 is a block diagram of an example computing device in accordance with some implementations.

FIG. 2 is a block diagram of an example computing device 200 including an instance of the partial image search 226. The partial image search 226 which may refer to either instance 226a when the computing device 200 is a server 122, 226b where the computing device 200 is a client device 106, or a combination of 226a and 226b where the functionality is divided between 226b of the client device 106 and 226a of the server 122. In the illustrated example, the computing device 200 includes a processor 202, a memory 204, a communication unit 208, and a display 218.

In some implementations, the computing device 200 is a client device 106, the memory 204 stores the partial image search 226b, and the communication unit 208 is communicatively coupled to the network 102 via signal line 114. In some implementations, the computing device 200 is a client device 106, which may occasionally be referred to herein as a user device, and the client device 106 includes at least one sensor, e.g., a camera. In another implementation, the computing device 200 is a server 122, the memory 204 stores the partial image search 226a, and the communication unit 208 is communicatively coupled to the network 102 via signal line 116.

The processor 202 may execute software instructions by performing various input/output, logical, and/or mathematical operations. The processor 202 may have various computing architectures to process data signals including, for example, a complex instruction set computer (CISC) architecture, a reduced instruction set computer (RISC) architecture, and/or an architecture implementing a combination of instruction sets. The processor 202 may be physical and/or virtual and may include a single processing unit or a plurality of processing units and/or cores. In some implementations, the processor 202 may be capable of generating and providing electronic display signals to a display device, supporting the display of images, capturing and transmitting images, and performing complex tasks and determinations. In some implementations, the processor 202 may be coupled to the memory 204 via the bus 206 to access data and instructions therefrom and store data therein. The bus 206 may couple the processor 202 to the other components of the computing device 200 including, for example, the memory 204, the communication unit 208.

The memory 204 may store and provide access to data for the other components of the computing device 200. The memory 204 may be included in a single computing device or distributed among a plurality of computing devices. In some implementations, the memory 204 may store instructions and/or data that may be executed by the processor 202. The instructions and/or data may include code for performing the techniques described herein. For example, in one implementation, the memory 204 may store an instance of the partial image search 226. The memory 204 is also capable of storing other instructions and data, including, for example, an operating system, hardware drivers, other software applications, databases, etc. The memory 204 may be coupled to the bus 206 for communication with the processor 202 and the other components of the computing device 200.

The memory 204 may include one or more non-transitory computer-usable (e.g., readable, writeable) device, a static random access memory (SRAM) device, a dynamic random access memory (DRAM) device, an embedded memory device, a discrete memory device (e.g., a PROM, FPROM, ROM), a hard disk drive, an optical disk drive (CD, DVD, Blu-ray™, etc.) mediums, which can be any tangible apparatus or device that can contain, store, communicate, or transport instructions, data, computer programs, software, code, routines, etc., for processing by or in connection with the processor 202. In some implementations, the memory 204 may include one or more of volatile memory and non-volatile memory. The memory 204 may be a single device or may include multiple types of devices and configurations.

The communication unit 208 is hardware for receiving and transmitting data by linking the processor 202 to the network 102 and other processing systems. The communication unit 208 receives data and transmits the data via the network 102. The communication unit 208 is coupled to the bus 206. In one implementation, the communication unit 208 may include a port for direct physical connection to the network 102 or to another communication channel. For example, the computing device 200 may be the server 122, and the communication unit 208 may include an RJ45 port or similar port for wired communication with the network 102. In another implementation, the communication unit 208 may include a wireless transceiver (not shown) for exchanging data with the network 102 or any other communication channel using one or more wireless communication methods, such as IEEE 802.11, IEEE 802.16, Bluetooth® or another suitable wireless communication method.

In yet another implementation, the communication unit 208 may include a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another implementation, the communication unit 208 may include a wired port and a wireless transceiver. The communication unit 208 also provides other connections to the network 102 for distribution of files and/or media objects using standard network protocols such as TCP/IP, HTTP, HTTPS, and SMTP as will be understood to those skilled in the art.

The display 218 may include a liquid crystal display (LCD), light emitting diode (LED), touchscreen, or any other similarly equipped display device, screen, or monitor. The display 218 represents any device equipped to display electronic images and data as described herein.

It should be apparent to one skilled in the art that other processors, operating systems, inputs (e.g., keyboard, mouse, one or more sensors, etc.), outputs (e.g., a speaker, display, haptic motor, etc.), and physical configurations are possible and within the scope of the disclosure. Examples of sensors (not shown) include, but are not limited to, a microphone, a speaker, a camera, a thermal camera, a pointer sensor (e.g., a capacitive touchscreen or mouse), a gyroscope, an accelerometer, a galvanic sensor, thermo-couple, heart rate monitor, breathing monitor, electroen-cephalogram (EEG), iris scanner, fingerprint reader, raster scanner, palm print reader, an inertial sensor, global posi-tioning system (GPS) sensor, etc.

In some implementations, the partial image search 226 provides the features and functionalities described below responsive to a request. For example, a request on behalf of an entity (not shown), such as a financial institution, to determine whether a user-provided document image (e.g., provided during a registration or customer onboarding) is legitimate or potentially fraudulent. As another example, a request by the user to capture a document (e.g., as part of a registration or customer onboarding).

Figure 3:
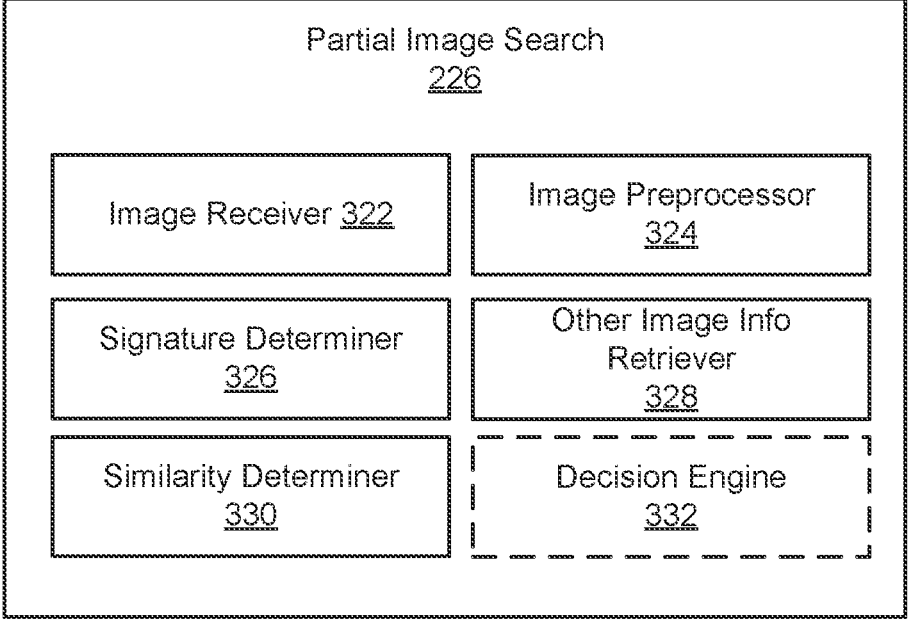
FIG. 3 is a block diagram of an example partial image search in accordance with some implementations.

Referring now to FIG. 3, a block diagram of an example of partial image search 226 is illustrated in accordance with one implementation. As illustrated in FIG. 3, the partial image search 226 may include an image receiver 322, an image preprocessor 324, a signature determiner 326, an other image information retriever 328, a similarity deter-miner 330, and, optionally in some implementations, a decision engine 332.

The image receiver 322 is communicatively coupled to receive image data. For example, in some implementations, the image receiver 322 receive image data captured by a camera sensor. Examples of image data may include, but are not limited to, one or more of an image and a video. In some implementations, the received image represents a document and a background, or surroundings, of that document. For example, the received image data is captured by a camera sensor of the client device 106 responsive to the user 112 being prompted to take an image of the document. As another example, the received image data may be an image of a reference document obtained from the document's issuer as an example, such as an example image of a state driver's license obtained from the website of the state's division of motor vehicles.

The image receiver 322 makes the received image data available to one or more components of the partial image search 226. In some implementations, the image receiver 322 communicates the received image to, or stores the received image for retrieval by, one or more components of the partial image search 226, e.g., the image preprocessor 324.

The image preprocessor 324 is communicatively coupled to obtain image data, as an input, and preprocess image data. In some implementations, the image preprocessor 324 pre-processes the received image data. For example, an image or video of a document captured by the client device's camera sensor during a customer journey. In some implementations, the image preprocessor 324 preprocesses other image data. Examples of other image data may include, but is not limited to, images or videos of documents captured by other client devices' camera sensors during other (e.g., past) customer journeys, images or videos of documents identified to be fraudulent or associated with fraudulent attempts (e.g., fraudulent attempts to open an account, etc.), images or videos associated with a reference document (e.g., an image representing an example ID posted on the ID issuer's website), etc.

The image preprocessor 324 preprocesses image data. The preprocessing steps and their respective order may vary depending on the implementation. In some implementations, the image preprocessor 324 preprocesses image data by performing one or more of rectification, segmentation, and transformation.

Figure 4:
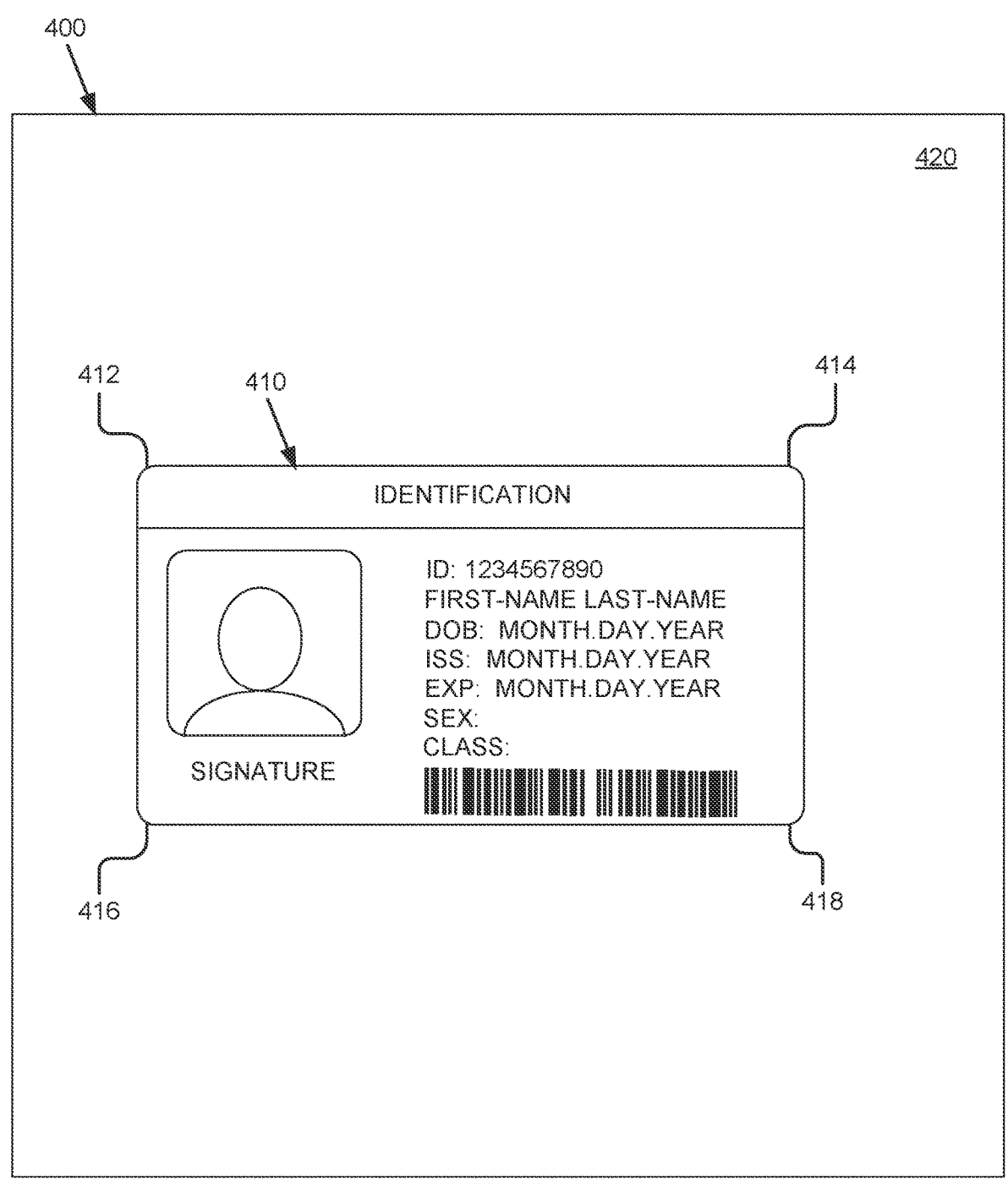
FIG. 4 is an illustration of an example image of a document in accordance with some implementations.

In some implementations, image preprocessor 324 recti-fies the image data to distinguish, or separate, a portion of the image that represents the document, occasionally referred to as a "document portion," or similar, from a portion of the image that represents a background, or the surroundings, of the document in the input image. For example, referring to FIG. 4, in some implementations, the image preprocessor 324 applies corner detection to identify the corners 412, 414, 416, 418 of the pictured document 410 and determines a document portion from the portion of the input image bounded within the identified corners and determines a background portion 420 from the portion of the input image 400 out of bounds of the identified corners 412, 414, 416, and 418.

In some implementations, the image preprocessor 324 may rectify the image data, or a portion thereof, by per-forming one or more of a rotation, a translation, and a de-skew. For example, in some implementations, the image preprocessor 324 determines the polygon associated with a document portion and rotates and de-skews the polygon, e.g., to generate a rectangle. In some implementations, the image preprocessor 324 may determine a type of document imaged in the document portion and use a known aspect ratio of that document type to rectify the image.

In some implementations, the image preprocessor 324 may segment the image data or a portion thereof. For example, the background portion of the image may have an irregular shape due to a void (e.g., in the center) where the document was represented; in some implementation, the image preprocessor 324 may segment the background into segments. For example, in some implementations, the back-ground portion is a "rectangular donut" have an outer rectangular boundary (i.e., the outer bounds of the image) and an inner quadrilateral boundary for the "donut hole" (i.e., boundary associated with the document and document portion), and the image preprocessor 324 segments the background portion into top, bottom, left, and right quadri-lateral segments. As another example, the image preproces-sor 324 may segment the document portion into one or more segments. In some implementations, the one or more seg-ments of the document portion are associated with areas of the ID expected to be individualized, or unique, per instances of the ID (e.g., photo, signature, ID number, full name, address, etc.).

In some implementations, the image preprocessor 324 applies a transformation to one or more of the document portion, the background portion, at least one segment of the background portion, and at least one segment of the docu-ment portion. For example, in some implementations, the image preprocessor 324 applies a transformation to one or more of the document portion, the background portion, the at least one segment of the background portion, and the at least one segment of the document portion, to reduce the size of the image. For example, in some implementations, the image preprocessor 324 generate a single pixel representa-tion of that image portion, or segment(s) thereof.

The image preprocessor 324 outputs a preprocessed image. As the preprocessing may vary depending on the implementation, the preprocessed image may vary. For example, in some implementations, it may be desirable to analyze the background, e.g., to capture fraudsters that are taking images manually with a similar background or digi-tally editing an image of a document with a static back-ground, but making slight tweaks (e.g., to resolution) so that the backgrounds are not identical between attempts; in some implementations, the preprocessed image may include, or only include depending on the implementation, a result of the transformation(s) applied to the background portion of the image or one or more of the segments thereof. As another example, it may be desirable to analyze the document, e.g., to capture fraudsters that are taking images manually with similar documents or digitally making slight tweaks to an image of the document; in some implementations, the preprocessed image may include, or only include depending on the implementation, a result of the transformation(s) applied to the document portion of the image or one or more of the segments thereof.

The signature determiner 326 determines a signature associated with an image. In some implementations, a raw, input/received, image may be associated with one or more signatures. For example, in implementations, where the received image is rectified (e.g., to separate a background portion of the received image and a document portion of the received image), the received image may be associated with multiple signatures including one or more signatures determined for the background portion (or segments thereof) and one or more signatures of a document portion (or segments thereof).

The signature determiner 326 determines one or more signatures associated with an image from one or more of the image, a portion of the image, a segment of the image, and a post transformation image. For example, in some implementations, the image preprocessor 324 preprocesses an image and generates one or more preprocessed images and generates a signature associated with each preprocessed image.

Depending on the implementation and use case, the signature may vary. For example, in some implementations, the signature determiner 326 determines a signature based on one or more hashes. For example, the signature determiner 326 determines a signature based on one or more of an average hash, a perceptual hash, a difference hash, and a wavelet hash. In some implementations, the signature determiner 326 determines a signature based on a composite of multiple hashes. For example, in some implementations, the signature determiner 326 determines a signature based on two or more of an average hash, a perceptual hash, a difference hash, and a wavelet hash by determining the two or more hashes and concatenating the two or more hashes to generate the signature. For example, assume the average hash is 1000, the perceptual hash is 1111, the difference hash is 0100, and the wavelet hash is 0001, the signature determiner 326 determines a signature as 1000111101000001 by concatenating the four aforementioned hashes associated with the received image (or a portion thereof, depending on the implementation). It should be recognized that the preceding example hashes are simplified hashes used for clarity and convenience and may not be representative of hashes in implementation. It should further be recognized that the preceding is merely an example of a composite hash and that variations in the manner of composition (e.g., other than concatenation), the number of hashes composited (e.g., 1, 2, 3, 4, etc.), and relative order of composition (e.g., the hashes may be concatenated in other orders) are contemplated and within the scope of the present disclosure. In some implementations, the signature may be based on machine learning. For example, in some implementations, an image is input to a neural network, such as a convolutional neural network, and the resulting encoding of the image is the signature.

The signature determiner 326 is communicatively coupled to one or more of the other information retriever 328 and the similarity determiner 330. For example, the signature determiner 326 sends, or stores for retrieval, the one or more signatures. In some implementations, the signature determiner 326 stores or passes the one or more signatures associated with an input image for use by the similarity determiner 330 in determining whether that input image is similar to any other image(s), and those one or more signatures are subsequently obtained as information associated with one or more other images for comparison to a subsequently received input image, thereby growing an archive of signatures associated with other images.

The other image information retriever 328 obtains information associated with one or more other images. In some implementations, the other information retriever 328 obtains other image information that is used by the similarity determiner 330 to determine a similarity between the received image and the one or more other images. For example, in some implementations, the other information retriever 328 receives, as other image information, one or more signatures associated with one or more other images, which may be used by the similarity determiner 330 to determine whether the received image is similar to any of the one or more other images based on their respective signatures.

In some implementations, the other image info may include information derived from previously received images. The other image information may vary based on the implementation and use case. Examples of other image info include, but are not limited to, one or more of: a rectified other image, other image segment(s), transformed/post processed other images or segments thereof, hash(es) associated with an other image, signature(s) associated with an other image, one or more labels, such as document type, associated with an other image, etc.

The document type may vary based on the implementation and use case. In some implementations, the document type may include a type associated with identification documentation. Examples of types associated with identification documentation include, but are not limited to a passport, driver's license, government issued photo identification card, school identification, employee identification, etc. In some implementations the document type label may include an issuer of the identification document type. Examples of issuers include, but are not limited to a country, state, province, municipality, jurisdiction, school, business, employer, or other entity. For example, a label associated with a US passport image may include a passport, documentation type label component, and a US, issuer label component. It should be recognized that, while the description herein frequently refers to documents that are identification documents, the description herein may apply to other documentation including, but not limited to, bank statements, utility bills, tax documents, etc.

In some implementations, the other image information retriever 328 accesses the other image information. For example, the other image information retriever 328 accesses the other image information, without filtration, and the similarity determiner 330 processes the other image information to determine whether a similarity exists.

In some implementations, the other image information retriever 328 filters the other image information. For example, the other image information retriever 328 filters the other image information to reduce the processing required overall and/or by the similarity determiner 330. For example, in some implementations, other image information retriever 328 may calculate a hamming distance between a signature associated with an input image (e.g., concatenated hashes associated with a document portion of the received image) and a corresponding signature associated with other images (e.g., the concatenated hashes associated with a document portion of the other images). In some implementations, once the hamming distance between the signature of input image and the other images are determined, the other image information retriever 328 determines a subset of the other images with the smallest hamming distance. For example, the other image information retriever 328 determines the X other images with the smallest hamming distance, where X may be in the 10s, 100s, or 1000s depending on the implementation.

The similarity determiner 330 determines a similarity between signatures associated with different images. In some implementations, the similarity determiner 330 determines the similarity between a signature associated with a received image and a corresponding signature associated with one of the other images.

Depending on the implementation, the similarity determiner 330 may apply one or more of cosine similarity, dot product, and Euclidean distance. For example, the similarity determiner 330 determines the cosine similarity of the concatenated hashes associated with a document portion of a received image to the concatenated hashes of document portions of other images and determines whether a similarity exists. The preceding example is merely an example, it should be recognized that, as described herein, the signature may vary depending on the implementation (e.g., the number, types of hashes, order of hashed, be an encoding of various formats output by a neural network, etc.), and while, for brevity, a dedicated example of determining similarity for each potential signature is not described here, those variations are within the scope of this disclosure. Similarly, as described herein, the preprocessed image and/or portions, or segments, of the preprocessed image used to generate a signature and subsequently used to determine similarity may vary depending on the implementation (e.g., to include one or more of a document portion, at least one segment thereof, a background portion, and at least one segment thereof), but for brevity, a dedicated example of each potential variation of what portion, or segment(s) associated with an image are analyzed for similarity is not described here; however, those variations are within the scope of this disclosure. Similarly, as described herein, various similarity determinations besides cosine similarity are described, but for brevity, a dedicated example of each is not described here; however, those variations are within the scope of this disclosure.

In some implementations, the similarity may be associated with a threshold. For example, when the cosine similarity satisfies the threshold, similarity exists, and when the cosine similarity threshold is not satisfied, a similarity does not exist.

The decision engine 332 makes a determination on whether the similarity determiner 330 determines the input image is similar to one or more other images. In some implementations, the decision engine 332 determines and/or initiates an action. Examples of actions include, but are not limited to one or more of accept or reject, contact authorities, escalate for investigation or for additional verification checks, etc.

In some implementations, the decision engine 332 makes a determination based at least in part on a number of similarities. For example, when an input image is similar to a greater number of other image instances (e.g., greater than may be expected by a user making an honest error in the first instance(s) and reattempting) it may be more indicative of repeated fraudulent attempts, and the decision engine 332 may determine to act accordingly.

In some implementations, the decision engine 332 makes a determination based at least in part on a label. For example, if the input image is associated with a label representing a document that is more often used in fraudulent attacks, the decision engine 332 may be more inclined to act on the input image as another instance of fraud. As another example, if the other images to which the input image is determined to be similar are associated with a "attempted fraud" or "rejected" label, the decision engine 332 may be more inclined to act on the input image as another instance of attempted fraud and reject the input image or associated request.

In some implementations, the decision engine 332 uses machine learning, e.g., to determine one or more of the parameters/criteria and/or values used to make which decision(s) may be determined by training machine learning algorithm(s).

Example Methods

FIGS. 5-9 are flowcharts of example methods that may, in accordance with some implementations, be performed by the systems described above with reference to FIGS. 1-3. The methods 500, 504, 506, 508, and 510 of FIGS. 5-9, respectively, are provided for illustrative purposes, and many variations exist and are within the scope of the disclosure herein.

FIG. 5 is a flowchart of an example method 500 for automatically detecting and capturing a document in accordance with some implementations. At block 502, the image receiver 322 receives an input image. At block 504, the image preprocessor 324 preprocesses a received input image. At block 506, the signature determiner 326 determines a signature based on the input image. At block 508, the other image information retriever 328 obtains information associated other images including the other images' signatures. At block 510, the similarity determiner 330 determines whether the received image is similar to any other image based on their respective signatures. At block 512, the decision engine 332 makes a determination based on the similarity, or lack thereof, determined at block 510. Depending on the implementation, the decision engine 332 is optional, and block 512 is also optional and may be omitted.

Figure 6:
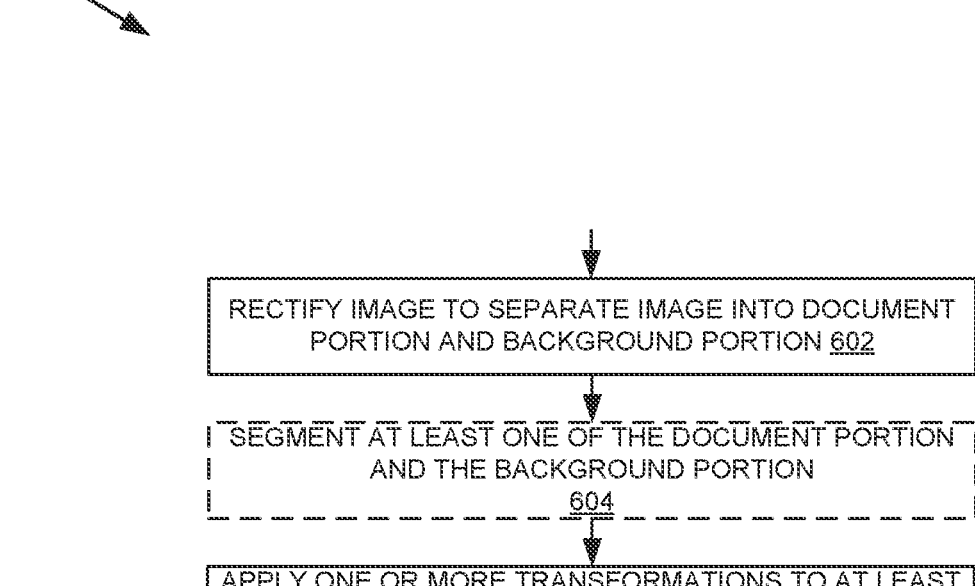
FIG. 6 is a flowchart of an example method for preprocessing an image in accordance with some implementations.

FIG. 6 is a flowchart of an example method 504 for preprocessing an image in accordance with some implementations. At block 602, the image preprocessor 324 rectifies the received image to separate the received image into a document portion and background portion. At block 604, the image preprocessor 324 segments at least one of the document portion and the background portion into a plurality of segments. At block 606, the image preprocessor 324 applies one or more transformations to at least one of the document portion and the background portion. Depending on the implementation, the block 604 is optional and may be omitted.

FIG. 7 is a flowchart of an example method 506 for determining an image signature in accordance with some implementations. At block 702, the signature determiner 326 applies an average hash function to the received image or a portion thereof. At block 704, the signature determiner 326 applies a perceptual hash function to the received image or the portion thereof. At block 706, the signature determiner 326 applies a difference hash function to the received image or the portion thereof. At block 708, the signature determiner

326 applies a wavelet hash function to the received image or the portion thereof. At block 710, the signature determiner 326 combines the result of blocks 702, 704, 706, and 708 into a signature of for the image or portion (e.g., document and/or background) thereof.

FIG. 8 is a flowchart of an example method 508 for retrieval of data for a similarity comparison in accordance with some implementations. At block 802, the other image information retriever 328 obtains a signature associated with the received image where the signature includes a concatenated string of hashes associated with the received image. At block 804, the other image information retriever 328 sets N=1. At block 806, the other image information retriever 328 obtains a signature associated with an $N^{th}$ image, where the signature includes a concatenated string of hashes associated with the $N^{th}$ image. At block 808, the other image information retriever 328 determines a hamming distance between the concatenated string of hashes associated with the received image and the $N^{th}$ image. At block 810, the other image information retriever 328 determines whether there is a next image in the other images. When a next, or yet to be processed, other image exists (810—YES), the other image information retriever 328 sets N=N+1, at block 812, and the method 508 continues at block 806. The blocks 806, 808, 810, and 812 may be repeated until a complete set of other images are analyzed (810—No). When there is no next, or yet to be processed, other image (810—NO), the method 508 continues at block 814. At block 814, the other image information retriever 328 determines a subset of the other images based on the set of hamming distances produced from the repeated performance of block 808. At block 816, the other image information retriever 328 provides information associated with the subset of other images for similarity determination, e.g., provided for determination at block 510 of FIG. 5.

Figure 9:
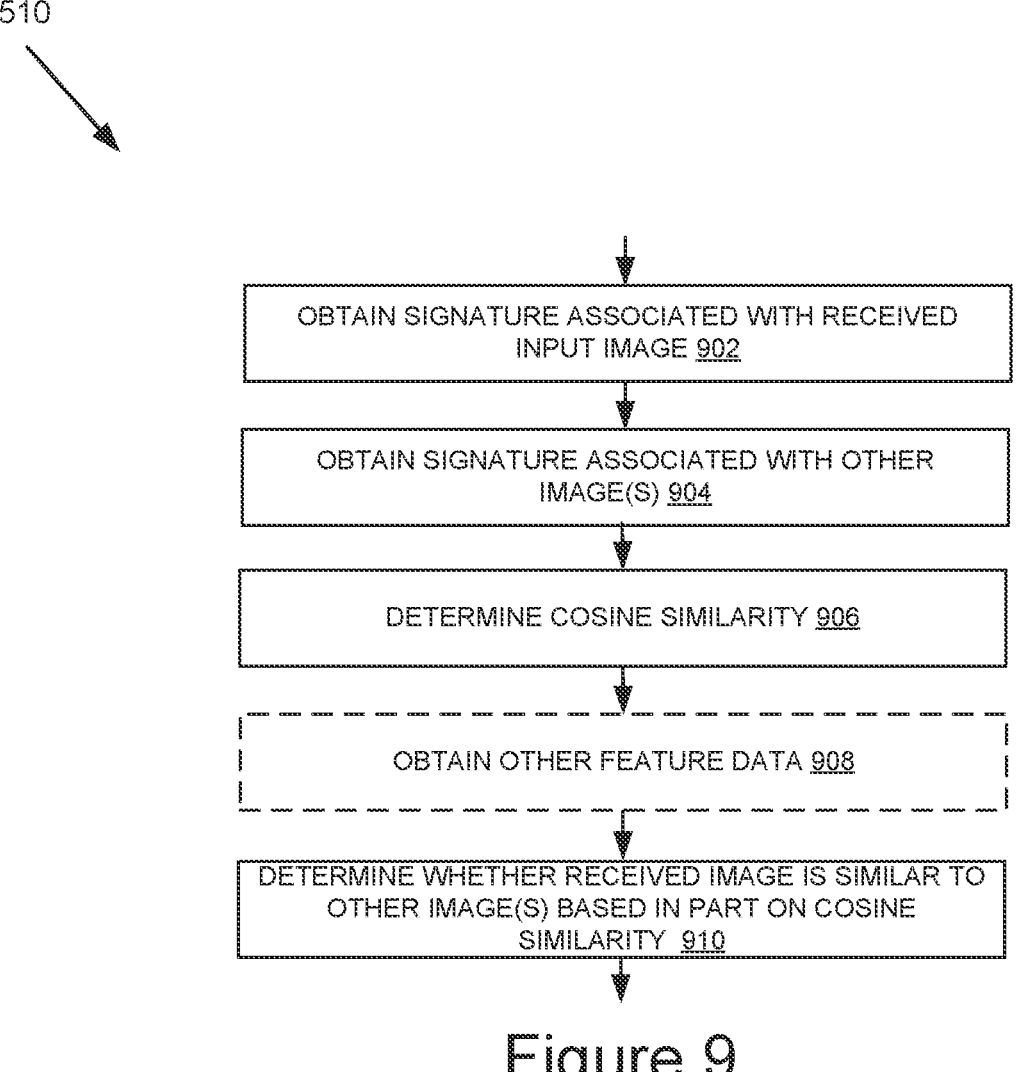
FIG. 9 is a flowchart of an example method for determining partial image similarity in accordance with some implementations.

FIG. 9 is a flowchart of an example method for determining partial image similarity in accordance with some implementations. At block 902, the similarity determiner 330 obtains the signature associated with the received input image or portion thereof. At block 904, the similarity determiner 330 obtains the signatures associated with one or more other images or the portions thereof. At block 906, the similarity determiner 330 determines the cosine similarity between the signature associated with the received image or portion thereof and the signatures associated with the other images or portions thereof. At block 908, the similarity determiner 330 may optionally obtain other feature data. At block 910, the similarity determiner 330 determines whether, based at least in part on the cosine similarity of their respective signatures, the received image is similar to one or more of the other images. Depending on the implementation, the determination of similarity at block 910 may be based at least in part on the other features data obtained at block 908.

Other Considerations

It should be understood that the above-described examples are provided by way of illustration and not limitation and that numerous additional use cases are contemplated and encompassed by the present disclosure. In the above description, for purposes of explanation, numerous specific details are set forth in order to provide a thorough understanding of the present disclosure. However, it should be understood that the technology described herein may be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

Reference in the specification to "one implementation" or "an implementation" or "some implementations" means that a particular feature, structure, or characteristic described in connection with the implementation is included in at least one implementation. The appearances of the phrase "in some implementations" in various places in the specification are not necessarily all referring to the same implementations.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of a hardware implementation, a software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer-readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As should be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies, engines, and other aspects of the disclosure can be implemented as software, hardware, firmware, or any combination of the foregoing. Also, wherever an element, an example of which is a module, of the specification is implemented as software, the element can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A method comprising:

receiving, using one or more processors, an input image representing a first image of an identification document;

preprocessing, using the one or more processors, the input image, wherein preprocessing the input image includes segmenting the input image into a document portion and a background portion, the document portion representing the identification document in the input image, and the background portion representing a surrounding of the identification document in the input image and nonoverlapping with the document portion;

determining, using the one or more processors, at least one signature based on the preprocessed input image, wherein the at least one signature includes one or more of:

a first signature determined by applying a first set of hash functions to the document portion resulting in a first set of hashes and concatenating the first set of hashes, the first signature including the concatenated first set of hashes, and a second signature determined by applying a second set of hash functions to the background portion resulting in a second set of hashes and concatenating the second set of hashes, the second signature including the concatenated second set of hashes;

obtaining, using the one or more processors, information associated with other images, the information associated with the other images including signatures associated with the other images;

determining, using the one or more processors, a set of hash-based similarity measures between one or more of:

the concatenated first set of hashes associated with the document portion of the input image and concatenated hashes included in signatures associated with document portions of the other images, and the concatenated second set of hashes associated with the background portion of the input image and concatenated hashes included in signatures associated with background portions of the other images; and determining, using the one or more processors, whether one or more of (1) the document portion of the input image is similar to another document portion in the other images and (2) the background portion of the input image is similar to another background portion in the other images, wherein similarity is determined based at least in part on a hash-based similarity measure between concatenated hashes included in their respective signatures.

2. The method of claim 1, wherein preprocessing the input image includes:

rectifying the input image; and applying one or more transforms.

3. The method of claim 1 further comprising one or more of:

rejecting the input image, flagging the input image as fraudulent, subjecting a user to additional verification, subjecting the user to a higher level of scrutiny, rejecting the user, subjecting a user request to additional verification, subjecting the user request to a higher level of scrutiny, and rejecting the user request.

4. The method of claim 1, wherein the first set of hash functions includes one or more of an average hash function, a perceptual hash function, a difference hash function, and a perceptual hash function; and the second set of hash functions includes one or more of the average hash function, the perceptual hash function, the difference hash function, and the perceptual hash function.

5. The method of claim 1, wherein the set of hash-based similarity measures includes a cosine similarity.

6. The method of claim 5, wherein determining whether the input image is similar to one or more of the other images is based at least in part on the cosine similarity between their respective concatenated hashes satisfying a threshold.

7. The method of claim 5, wherein determining whether the input image is similar to one or more of the other images is based at least in part on the cosine similarity between their respective concatenated hashes and a set of other features, wherein the other features include one or more of a number of similar other images and a subtype associated with the identification document in the input image.

8. The method of claim 1, wherein the set of hash-based similarity measures includes a hamming distance.

9. The method of claim 1, wherein determining the set of hash-based similarity measures is based on a machine learning model.

10. The method of claim 9, wherein the machine learning model is based on a random forest or neural network.

11. A system comprising:

one or more processors; and a memory, the memory storing instructions that, when executed by the one or more processors, cause the system to:

receive an input image representing a first image of an identification document;

preprocess the input image, wherein preprocessing the input image includes segmenting the input image into a document portion and a background portion, the document portion representing the identification document in the input image, and the background portion representing a surrounding of the identification document in the input image and nonoverlapping with the document portion;

determine at least one signature based on the preprocessed input image, wherein the at least one signature includes one or more of:

a first signature by applying a first set of hash functions to document portion resulting in a first set of hashes and concatenating the first set of hashes, the first signature including the concatenated first set of hashes, and a second signature determined by applying a second set of hash functions to the background portion resulting in a second set of hashes and concatenating the second set of hashes, the second signature including the concatenated second set of hashes;

obtain information associated with other images, the information associated with the other images including signatures associated with the other images;

determine a set of hash-based similarity measures between one or more of:

the concatenated first set of hashes associated with the document portion of the input image and concatenated hashes included in signatures associated with document portions of the other images, and the concatenated second set of hashes associated with the background portion of the input image and concatenated hashes included in signatures associated with background portions of the other images; and determine whether one or more of (1) the background document portion of the input image is similar to another document portion in the other images and (2) the background portion of the input image is similar to another background portion in the other images, wherein similarity is determined based at least in part on a hash-based similarity measure between concatenated sets of hashes included in their respective signatures.

12. The system of claim 11, wherein the instructions for preprocessing the input image further cause the one or more processors to:

rectify the input image; and apply one or more transforms.

13. The system of claim 11, wherein the instructions further cause the one or more processors to one or more of:

reject the input image, flag the input image as fraudulent, subject a user to additional verification, subject the user to a higher level of scrutiny, reject the user, subject a user request to additional verification, subject the user request to a higher level of scrutiny, and reject the user request.

14. The system of claim 11, wherein the first set of hash functions includes one or more of an average hash function, a perceptual hash function, a difference hash function, and a perceptual hash function; and the second set of hash functions includes one or more of the average hash function, the perceptual hash function, the difference hash function, and the perceptual hash function.

15. The system of claim 11, wherein the set of hash-based similarity measures includes a cosine similarity.

16. The system of claim 15, wherein determining whether the input image is similar to one or more of the other images is based at least in part on the cosine similarity between their respective concatenated hashes satisfying a threshold.

17. The system of claim 15, wherein determining whether the input image is similar to one or more of the other images is based at least in part on the cosine similarity between their respective concatenated hashes and a set of other features, wherein the other features include one or more of a number of similar other images and a subtype associated with the identification document in the input image.

18. The system of claim 11, wherein the set of hash-based similarity measures includes a hamming distance.

19. The system of claim 11, wherein determining the set of hash-based similarity measures is based on a machine learning model.

20. The system of claim 19, wherein the machine learning model is based on a random forest or neural network.

* * * * *